United States Patent
Sugimoto

(10) Patent No.: US 9,230,184 B2
(45) Date of Patent: Jan. 5, 2016

(54) IMAGE DISPLAY CONTROL APPARATUS AND METHOD, AND PROGRAM FOR CONTROLLING IMAGE DISPLAY CONTROL APPARATUS

(75) Inventor: Masahiko Sugimoto, Asaka (JP)

(73) Assignee: FUJIFILM CORPORATION, Tokyo (JP)

( * ) Notice: Subject to any disclaimer, the term of this patent is extended or adjusted under 35 U.S.C. 154(b) by 2317 days.

(21) Appl. No.: 11/089,225

(22) Filed: Mar. 25, 2005

(65) Prior Publication Data

US 2005/0234324 A1    Oct. 20, 2005

(30) Foreign Application Priority Data

Mar. 31, 2004  (JP) .................................. 2004-101784

(51) Int. Cl.
G06K 9/32    (2006.01)
G06K 9/00    (2006.01)
H04N 5/232   (2006.01)

(52) U.S. Cl.
CPC .......... *G06K 9/3208* (2013.01); *G06K 9/00228* (2013.01); *H04N 5/23219* (2013.01); *H04N 5/23293* (2013.01)

(58) Field of Classification Search
USPC .................................. 382/118, 309; 348/239
See application file for complete search history.

(56) References Cited

U.S. PATENT DOCUMENTS

| | | | | |
|---|---|---|---|---|
| 5,680,481 A * | 10/1997 | Prasad | ........................... | 382/118 |
| 5,774,591 A * | 6/1998 | Black | ........................... | 382/118 |
| 5,802,220 A * | 9/1998 | Black | ........................... | 382/100 |
| 5,835,616 A * | 11/1998 | Lobo et al. | .................... | 382/118 |
| 5,859,921 A * | 1/1999 | Suzuki | ........................... | 382/118 |
| 5,878,156 A * | 3/1999 | Okumura | ....................... | 382/118 |
| 5,973,664 A * | 10/1999 | Badger | | |
| 5,982,912 A * | 11/1999 | Fukui | ............................. | 382/115 |
| 6,246,779 B1 * | 6/2001 | Fukui et al. | .................... | 382/103 |
| 6,571,002 B1 * | 5/2003 | Ogawa | ........................... | 340/575 |
| 6,671,391 B1 * | 12/2003 | Zhang | ........................... | 382/118 |
| 6,950,535 B2 * | 9/2005 | Sibayama et al. | ............ | 382/113 |
| 7,120,279 B2 * | 10/2006 | Chen et al. | ..................... | 382/118 |
| 7,158,177 B2 * | 1/2007 | Kage | | |

(Continued)

FOREIGN PATENT DOCUMENTS

JP    8-138024    5/1996
JP    8-339437    12/1996

(Continued)

OTHER PUBLICATIONS

Japanese Office Action dated Mar. 11, 2008 with English Translation.

(Continued)

*Primary Examiner* — Tsung-Yin Tsai
(74) *Attorney, Agent, or Firm* — McGinn IP Law Group, PLLC

(57) ABSTRACT

An image within a search area of an image of interest is rotated from 0 to 345° in increments of 15°. An evaluation value of facial likeliness of an image after rotation thereof by each angular increment is calculated. A correction angle is calculated based upon a rotation angle (rotational manipulated variable θ) that affords the maximum evaluation value calculated. The image of interest is displayed upon being rotated based upon the correction angle calculated. Thus, the image of interest is displayed in an orientation suitable for appreciation.

11 Claims, 14 Drawing Sheets

(56) References Cited

U.S. PATENT DOCUMENTS

| | | | |
|---|---|---|---|
| 7,239,726 B2* | 7/2007 | Li | 382/118 |
| 7,349,558 B2* | 3/2008 | Enomoto | 382/118 |
| 2002/0150280 A1* | 10/2002 | Li | 382/117 |
| 2003/0108225 A1* | 6/2003 | Li | 382/118 |
| 2003/0190060 A1* | 10/2003 | Pengwu | 382/118 |
| 2005/0100195 A1* | 5/2005 | Li | 382/118 |
| 2006/0078176 A1* | 4/2006 | Abiko et al. | 382/124 |
| 2006/0222264 A1* | 10/2006 | Guitarte Perez et al. | 382/296 |

FOREIGN PATENT DOCUMENTS

| | | |
|---|---|---|
| JP | 9-035070 | 2/1997 |
| JP | 9-171560 | 6/1997 |
| JP | 2003-319169 | 11/2003 |

OTHER PUBLICATIONS

Japanese Office Action dated Jun. 11, 2008 with English translation.

* cited by examiner

*Fig. 2*

| | FEATURE | VALUE | SCORE |
|---|---|---|---|
| 1 | PIXEL VALUE AT POSITION (x1,y1) IN SEARCH AREA | v_1 | p_1 |
| 2 | PIXEL VALUE AT POSITION (x2,y2) IN SEARCH AREA | v_2 | p_2 |
| : | : | : | : |
| i | PIXEL VALUE AT POSITION (x1,y1) IN SEARCH AREA IN CASE WHERE FILTER PROCESSING HAS BEEN APPLIED TO IMAGE IN SEARCH AREA | v_i | p_i |
| : | : | : | : |
| n | DIFFERENCE BETWEEN PIXEL VALUE AT POSITION (x1,y1) IN SEARCH AREA AND PIXEL VALUE AT POSITION (x2,y2) IN SEARCH AREA | v_n | p_n |

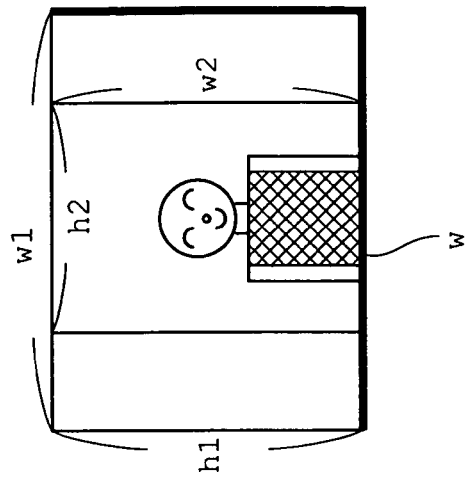
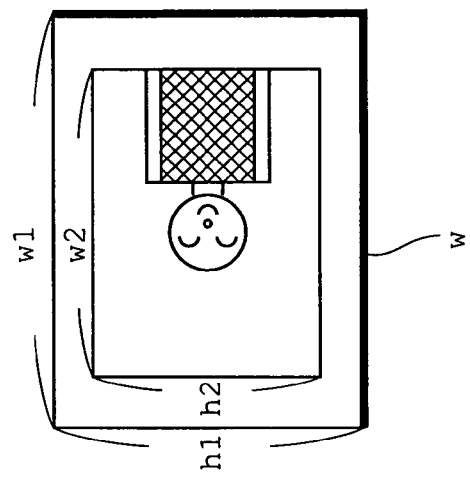
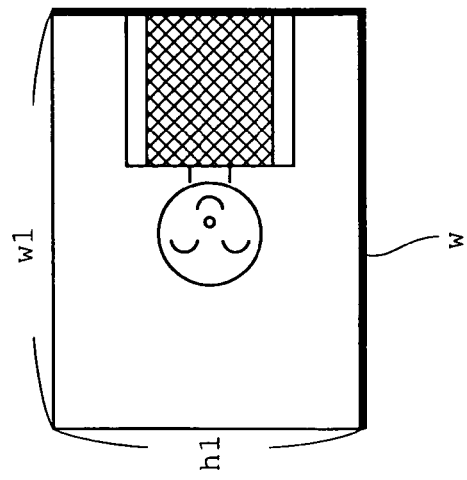

IMAGE DISPLAY CONTROL APPARATUS AND METHOD, AND PROGRAM FOR CONTROLLING IMAGE DISPLAY CONTROL APPARATUS

BACKGROUND OF THE INVENTION

1. Field of the Invention

This invention relates to an image display control apparatus and method and to a program for controlling the image display control apparatus.

2. Description of the Related Art

When the image of a subject is sensed using a digital still camera or the like, generally the camera is held so as to be suitable for a landscape-type display. However, a camera is not always held so as to be suitable for a landscape display and there are instances where a camera is held so as to be suitable for a portrait-type display. In a case where the image is displayed, however, generally the set-up is such that the image is displayed in the landscape-type format. In order to display in portrait format an image that has been captured in the portrait format, therefore, it is necessary to designate the image and rotate it in such a manner that it will be displayed in the landscape format.

In art disclosed heretofore (Japanese Patent Application Laid-Open No. 8-138024), the above-mentioned facts are taken into consideration and in a case where the subject is a person, the orientation of an image is discriminated based upon the positional relationship of the constituent parts of the body of the person.

However, with regard to an image that does not contain the constituent part of a body other than a face, as in the case of portrait photography, there are instances where image orientation cannot be determined.

DISCLOSURE OF THE INVENTION

Accordingly, an object of the present invention is to discriminate the orientation of an image and rotate the image upon rotating it in a direction suitable for the display.

According to a first aspect of the present invention, the foregoing object is attained by providing an image display control apparatus comprising in-area-image rotating means for rotating an image, which is located within a search area contained in an image of interest, through a specified angle in prescribed angular increments; evaluation-value calculating means for calculating an evaluation value, which represents facial likeliness of an image within the search area at each angle through which the image has been rotated in the prescribed angular increments by the in-area-image rotating means, using detection data for detecting a face image; rotation correction angle deciding means for deciding a rotation correction angle based upon an angle that affords a maximum value of the evaluation value representing facial likeliness at each angle by the evaluation-value calculating means; and display control means for controlling a display unit, in such a manner that the image of interest is rotated and displayed in a display window, using the rotation correction angle decided by the rotation correction angle deciding means.

The first aspect of the present invention also provides a method suited to the above-described image display control apparatus. More specifically, the first aspect of the present invention provides an image display method comprising the steps of rotating an image, which is located within a search area contained in an image of interest, through a specified angle in prescribed angular increments; calculating an evaluation value, which represents facial likeliness of an image within the search area at each angle through which the image has been rotated in the prescribed angular increments, using detection data for detecting a face image; deciding a rotation correction angle based upon an angle that affords a maximum value of the evaluation value representing facial likeliness at each angle; and controlling a display unit, in such a manner that the image of interest is rotated and displayed in a display window, using the rotation correction angle decided.

The first aspect of the present invention also provides a program for controlling the above-described image display control apparatus.

In accordance with the first aspect of the present invention, an image within a search area that is included in an image of interest to be displayed (the size of the search area may be smaller than or the same as the size of the image of interest) is rotated in prescribed angular increments (e.g., 15°) through a specified angle (e.g., an angle obtained by subtracting the prescribed angular increment from 360°, i.e., 345°). By using detection data that is for detecting a face image, an evaluation value representing the facial likeliness of an image within the search area (i.e., the degree to which the image within the search area is face-like) is calculated with regard to the image within the search area that has been rotated through the prescribed angular increment. A rotation correction angle is decided based upon the angle that affords the maximum value among the evaluation values representing facial likeliness. The image of interest is rotated using the rotation correction angle detected. The rotated image of interest is displayed in a display window. Thus, the image of interest is displayed in an orientation suitable for appreciation irrespective of the orientation in which the camera was held when the image was sensed.

According to a second aspect of the present invention, the foregoing object is attained by providing an image display control apparatus comprising evaluation-value calculating means for calculating an evaluation value, which represents facial likeliness of an image within a search area contained in an image of interest, using detection data for detecting a face image; evaluation-value calculation control means for executing angle conversion processing in such a manner that the detection data is rotated through a specified angle in prescribed angular increments, and controlling the evaluation-value calculating means in such a manner that evaluation-value calculation processing is executed every prescribed angular increment using the detection data that prevails after the angle conversion processing; rotation correction angle deciding means for deciding a rotation correction angle based upon an angle that affords a maximum value obtained in evaluation-value calculation processing at each prescribed angular increment; and display control means for controlling a display unit, in such a manner that the image of interest is rotated and displayed in a display window, using the rotation correction angle decided by the rotation correction angle deciding means.

The second aspect of the present invention also provides a method suited to the above-described image display control apparatus. More specifically, the second aspect of the present invention provides an image display method comprising the steps of calculating an evaluation value, which represents facial likeliness of an image within a search area contained in an image of interest, using detection data for detecting a face image; executing angle conversion processing in such a manner that the detection data is rotated through a specified angle in prescribed angular increments, and executing evaluation-value calculation processing every prescribed angular increment using the detection data that prevails after the angle conversion processing; deciding a rotation correction angle based upon an angle that affords a maximum value obtained in evaluation-value calculation processing at each prescribed angular increment; and controlling a display unit, in such a manner that the image of interest is rotated and displayed in a display window, using the rotation correction angle decided.

The second aspect of the present invention also provides a program for controlling the above-described image display control apparatus.

In accordance with the second aspect of the present invention, an evaluation value representing the facial likeliness of an image within a search area contained in an image of interest is calculated using detection data for detecting a face image. Angle conversion processing is executed so as to rotate the detection data through a specified angle in prescribed angular increments, and evaluation-value calculation processing is executed every prescribed angular increment using the detection data that prevails after the angle conversion processing. A rotation correction angle is decided based upon an angle that affords a maximum value among evaluation values obtained in the evaluation-value calculation processing executed at each prescribed angular increment. The image of interest is rotated and displayed in a display window. Thus, the image of interest is displayed in an orientation suitable for appreciation irrespective of the orientation in which the camera was held when the image was sensed.

According to a third aspect of the present invention, the foregoing object is attained by providing an image display control apparatus comprising detection data storage means in which detection data for detecting a face image is stored, the detection data being data suited to each angle in a case where an image of interest has been rotated through a specified angle in prescribed angular increments, the data being stored in correspondence with each prescribed angular increment; evaluation-value calculating means for calculating, at every prescribed angular increment, an evaluation value, which represents facial likeliness of an image within a search area contained in the image of interest, using detection data that has been stored for each prescribed angular increment; rotation correction angle deciding means for deciding a rotation correction angle based upon an angle that affords a maximum value of the evaluation value representing facial likeliness at each angle by the evaluation-value calculating means; and display control means for controlling a display unit, in such a manner that the image of interest is rotated and displayed in a display window, using the rotation correction angle decided by the rotation correction angle deciding means.

The third aspect of the present invention also provides a method suited to the above-described image display control apparatus. More specifically, the third aspect of the present invention provides an image display method comprising the steps of previously storing detection data for detecting a face image, the detection data being data suited to each angle in a case where an image of interest has been rotated through a specified angle in prescribed angular increments, the data being stored in correspondence with each prescribed angular increment; calculating, at every prescribed angular increment, an evaluation value, which represents facial likeliness of an image within a search area contained in the image of interest, using detection data that has been stored for each prescribed angular increment; deciding a rotation correction angle based upon an angle that affords a maximum value of the evaluation value representing facial likeliness at each angle; and controlling a display unit, in such a manner that the image of interest is rotated and displayed in a display window, using the rotation correction angle decided.

The third aspect of the present invention also provides a program for controlling the above-described image display control apparatus.

In accordance with the third aspect of the present invention, detection data that is the result of rotating an image of interest through a specified angle at prescribed angular increments is stored. An evaluation value representing the facial likeliness of an image within a search area contained in the image of interest is calculated at each prescribed angular increment using the items of detection data that have been stored. A rotation correction angle is decided based upon an angle that affords the maximum evaluation value. The image of interest is rotated and displayed in a display window using the rotation correction angle decided. Thus, the image of interest is displayed in an orientation suitable for appreciation irrespective of the orientation in which the camera was held when the image was sensed.

The apparatus may further comprise resizing means for resizing the image of interest in such a manner that the image of interest after the rotation thereof will fit within the display window in a case where the image of interest is rotated and displayed in the display window.

Further, in a case where the display window is a rectangle, it is preferred that the rotation correction angle deciding means decide the rotation correction angle of the image of interest in such a manner that one side of the rectangle will be rendered horizontal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 illustrates an example result of learning;

FIGS. 10(A) to (C) illustrate resize processing for resizing a displayed image of interest;

DESCRIPTION OF THE PREFERRED EMBODIMENTS

A preferred embodiment of the present invention will now be described in detail with reference to the drawings.

A digital still camera according to this embodiment is capable of reproducing the image of a subject obtained by image sensing. More particularly, according to this embodiment, the image of a face is detected from the image of a subject (an image of interest), and the image of the subject is displayed upon being rotated based upon the sensed image of the face in such a manner that the image of a person in the image of the subject will be made upright. Even in a case where the digital still camera is held in such a manner that the image of the subject obtained by image sensing is long vertically, the image of a person will be displayed upright.

Figure 1:
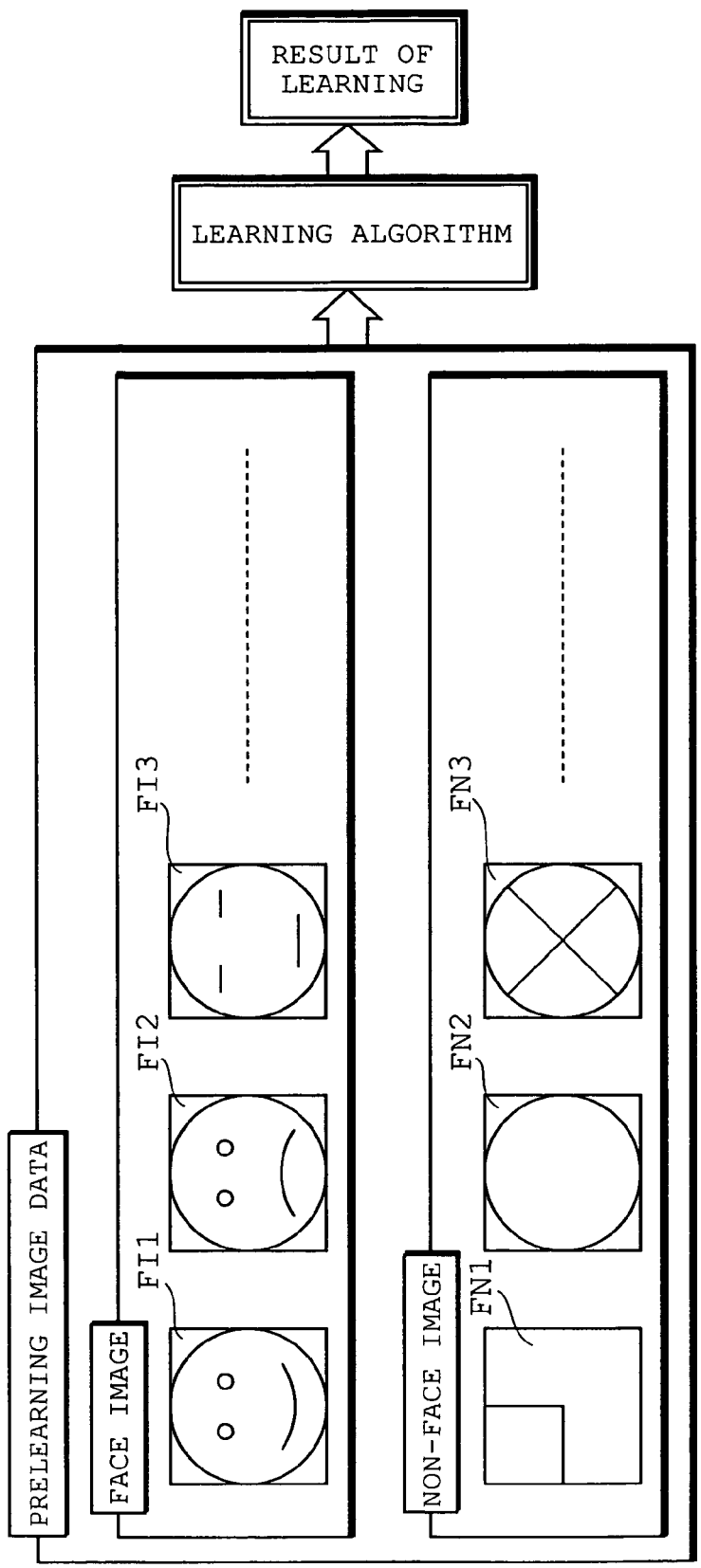
FIG. 1 illustrates manner of calculation of learning result for calculating an evaluation value of facial likeliness.

FIG. 1 illustrates the manner in which result of learning (detection data) utilized in the detection of a face image is generated in this embodiment.

Face image data and non-face image data is used as prelearning image data. Data representing images FI1, FI2, FI3, etc. of various faces is used for the face image data. Data representing non-face images, namely images that are not faces (which may be images that do or do not resemble the images of faces) FN1, FN2, FN3, etc., is used for the non-face image data.

Result of learning for determining whether an image is a face image or not is obtained in accordance with a prescribed learning algorithm using these items of prelearning image data. Data representing result of learning is stored in a digital camera.

FIG. 2 illustrates an example of a table representing result of learning.

Result of learning has been stored as pixel values at prescribed positions within a search area, pixel values at prescribed positions within the search area in a case where filter processing has been applied to an image within the search area, the differences between pixel values, and the scores of these values. A corresponding score (which may be positive or negative) is obtained from a value such as a certain pixel value, and a value obtained by accumulating the obtained scores becomes an evaluation value indicative of the facial likeliness of an image within the search area (i.e., the degree to which the image within the search area is face-like).

Figure 3:
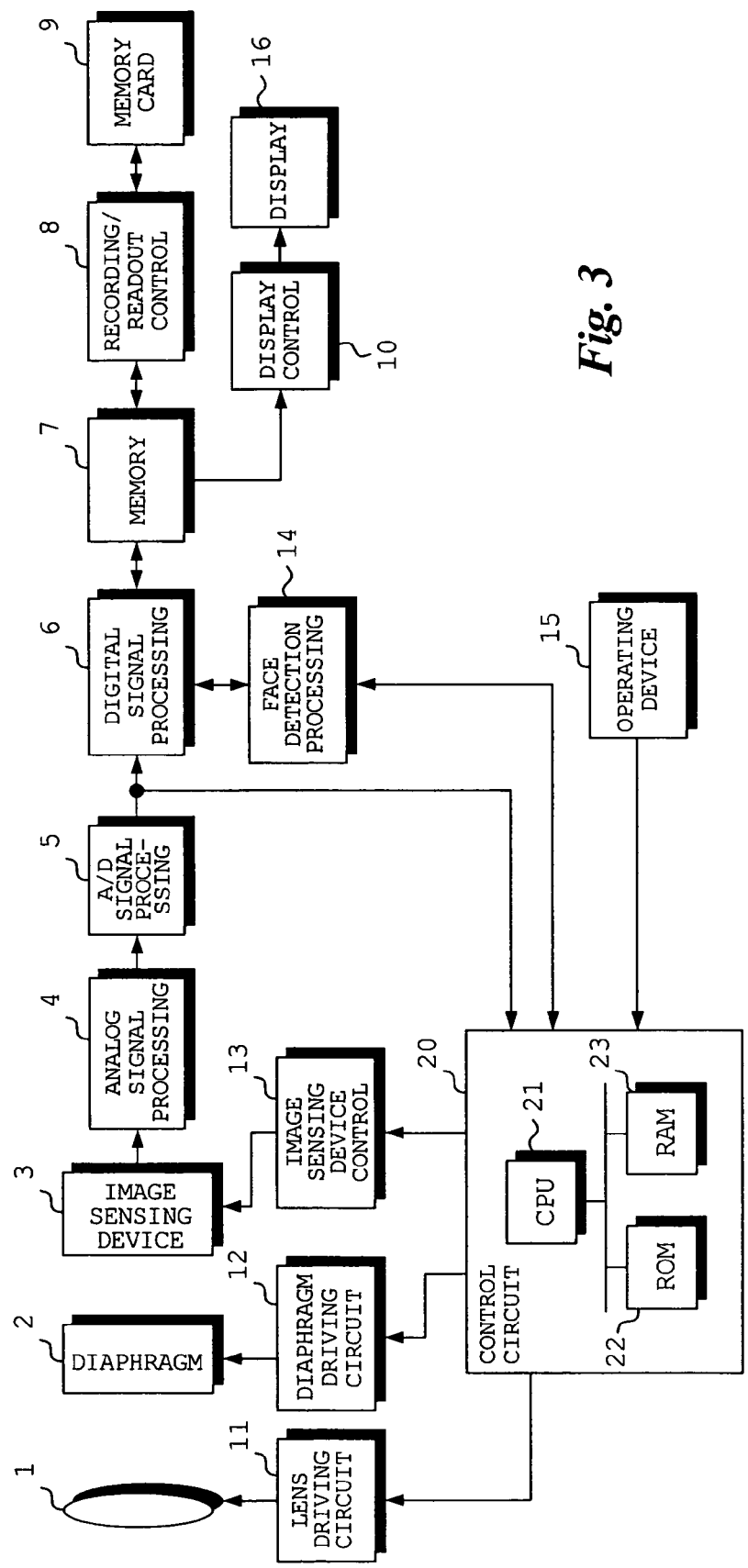
FIG. 3 is a block diagram illustrating the electrical structure of a digital still camera.

FIG. 3 is a block diagram illustrating the electrical structure of a digital still camera.

Processing executed when an image is sensed will be described before reproduction is described.

The overall operation of the digital still camera is controlled by a control circuit 20.

The control circuit 20 includes a CPU 21, a ROM 22 and a RAM 23 interconnected by a bus. Data representing result of learning as described above has been stored in the ROM 22. It goes without saying that template image data representing the image of a face may be stored in the ROM 22 rather than result of learning having the form of a table or the like as described above. The RAM 23 stores image data representing the image within the search area, as well as other image data.

The digital still camera includes an operating device 15 having a shutter-release button and a mode setting dial, etc. An operating signal that is output from the operating device 15 is input to the control circuit 20.

The zoom position of a zoom lens (the lens need not necessarily be a zoom lens) is controlled by a lens driving circuit 11. The aperture of a diaphragm 2 is controlled by a diaphragm driving circuit 12. A light beam representing the image of a subject is condensed by the zoom lens 1 and impinges upon an image sensing device 3 such as a CCD through the diaphragm 2. A light image representing the image of the subject is formed on the photoreceptor surface of the image sensing device 3.

If an image sensing mode is set by a mode setting dial, the image sensing device 3 is controlled by a control circuit 13 for the image sensing device 3, which outputs a video signal representing the image of the subject. The video signal is subjected to analog signal processing such as correlated double sampling in an analog signal processing circuit 4. The video signal that is output from the analog signal processing circuit 4 is converted to digital image data in analog/digital signal processing circuit 5 and the digital image data is input to the control circuit 20 and to a digital signal processing circuit 6. Digital signal processing such as a gamma correction and white balance adjustment is executed in the digital signal processing circuit 6.

The image data that has been output from the digital signal processing circuit 6 is applied to a display control circuit 10 via a memory 7. The image of the subject is displayed on the display screen of a display unit 16 by the display control circuit 10.

If the shutter-release button is pressed, the image of the subject is sensed again and image data representing the image of the subject is obtained in a manner similar to that described above. The image data is applied from the digital signal processing circuit 6 to the memory 7, where the data is stored temporarily. The image data is read out of the memory 7 and is recorded on a memory card 9 by a recording/readout control circuit 8. It goes without saying data compression may applied as necessary.

If a playback mode is set by the mode setting dial, image data representing the image of the subject is read out of the memory card 9 by the recording/readout control circuit 8. The image data that has been read out is input to a face detection processing circuit 14 through the memory 7 and digital signal processing circuit 6 (with data expansion processing being executed as necessary). Image data representing a detected face image is applied to and stored temporarily in the RAM 23. Image data representing the image of the subject also is stored temporarily in the RAM 23 within the control circuit 20. Display angle correction processing (correction processing that is based upon a rotation correction angle) of the image data representing the image of the subject is executed in such a manner that the face image will be rendered upright. This correction processing can be performed easily by an operation for addressing the image data.

The subject image data that has undergone display angle correction processing is applied to the display control circuit 10 via the digital signal processing circuit 6 and memory 7. Thus, the image of the subject in which the image of the person has been rendered upright is displayed on the display screen of the display unit 16.

Figure 4:
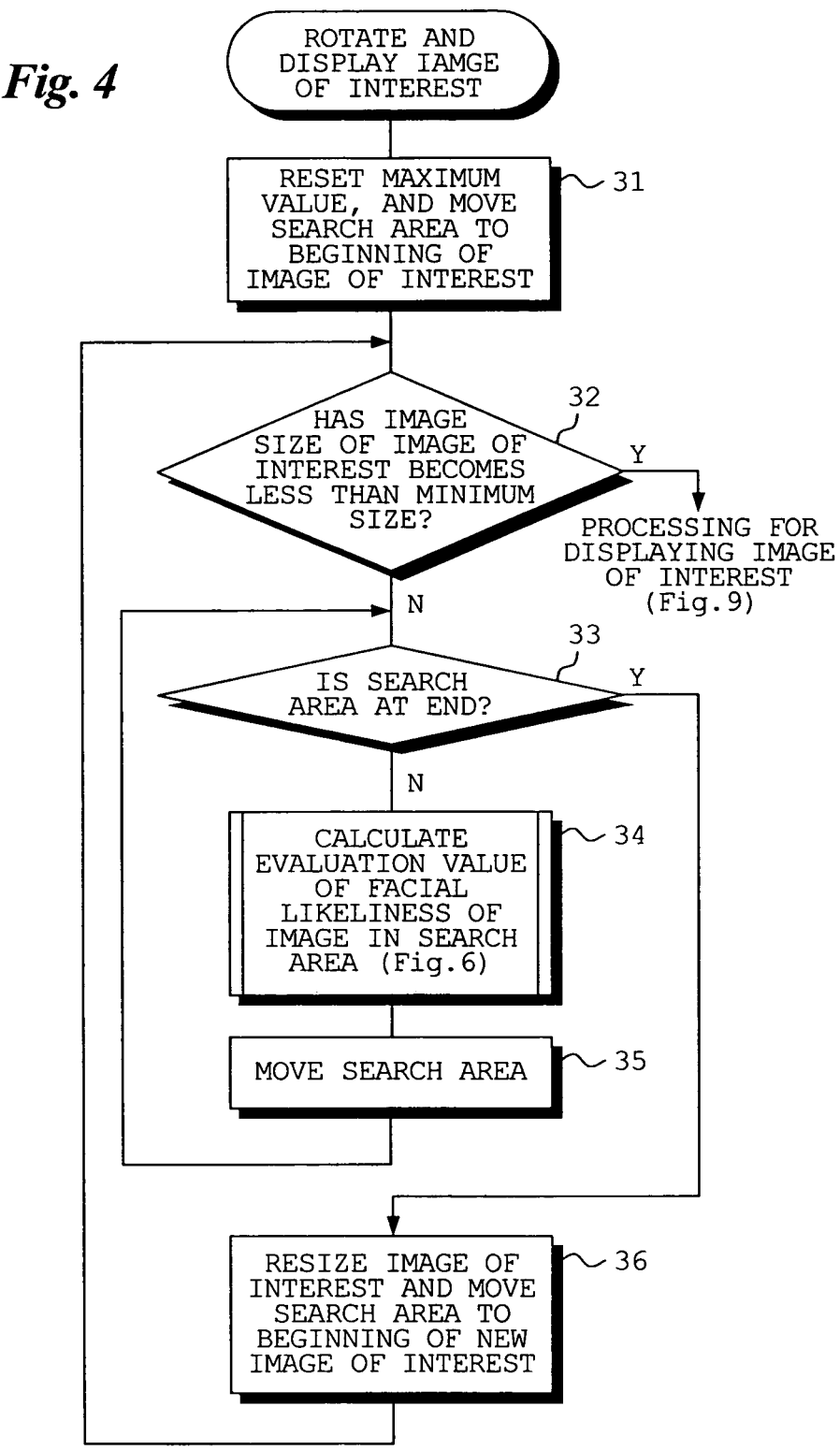
FIG. 4 is a flowchart illustrating processing for rotating and displaying an image of interest.
Figure 5:
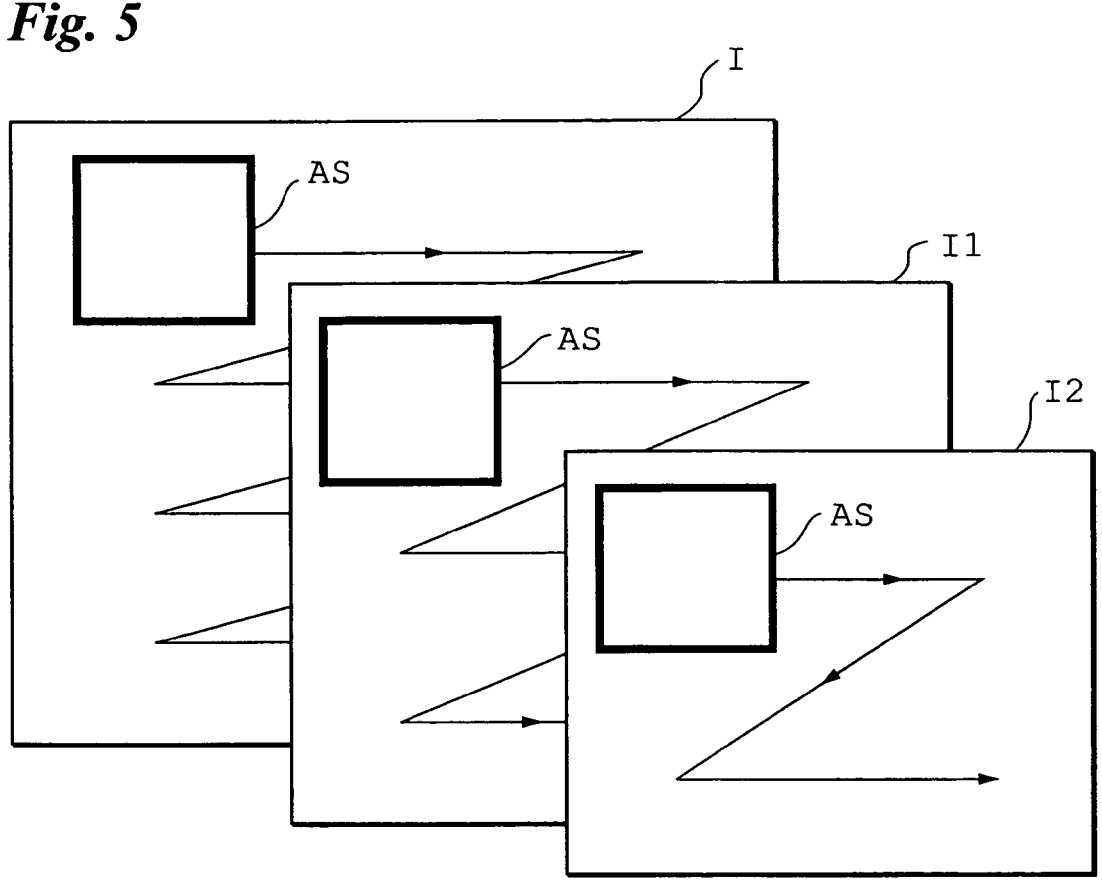
FIG. 5 illustrates the manner in which an image of interest is searched using a search area.

FIG. 4 is a flowchart illustrating processing for rotating and displaying an image of interest, and FIG. 5 illustrates the relationship between an image of interest and a search area.

This processing causes the search area to be scanned across the image of interest so that the degree of matching between the image within the search area and the above-mentioned result of learning (detection data) is evaluated. Further, as will be described later, the image within the search area is rotated in prescribed angular increments and processing for calculating an evaluation value is executed at each prescribed angle through which the image has been rotated incrementally. The image of a portion specified as by the position of the search area for which the maximum evaluation value has been obtained is judged to be the image of a face.

First, the maximum value of the evaluation value is reset to zero (step 31). Further, a search area AS is moved to the beginning of an image of interest I (step 31). In this embodiment, the size of the image of interest becomes gradually smaller and the image of interest diminishes to a prescribed minimum image size. An evaluation value of facial likeliness is calculated with regard to the image within the search area AS at each size. It is determined, therefore, whether the image size of the image of interest has become the prescribed minimum image size (step 32).

If the minimum image size has been attained ("YES" at step 32), processing for calculating the evaluation value will have been executed at various sizes and therefore the image of interest is displayed upon being rotated based upon the maximum evaluation value obtained. If the minimum image size has not been reached ("NO" at step 32), then it is determined whether the search area AS is at the end of the image of interest I (step 33).

If the search area AS is at the end of the image of interest I ("YES" at step 33), evaluation value calculation processing regarding the image of interest will have ended. Processing for resizing the image of interest I is executed, therefore, in such a manner that evaluation value calculation processing will be executed with regard to an image of interest I1 of the next smaller size (step 34). Further, the search area AS is moved to the beginning of the image of interest that has been resized. If the search area AS is not at the end of the image of interest ("NO" at step 33), then an evaluation value indicating the facial likeliness of the image within the search area AS is calculated (step 34). The details of processing for calculating the evaluation value will be described later. When processing for calculating the evaluation value ends, the search area is moved a small distance in the horizontal and vertical directions (step 35). The processing of steps 33 and 34 is repeated.

Thus, when processing for calculating an evaluation value of facial likeliness regarding the image within the search area AS ends with regard to the initial image of interest, evaluation value calculation processing is repeated until the image size reaches the minimum image size, as by applying this processing to image of interest I1 of smaller size and to image of interest I2 of still smaller size.

Figure 6:
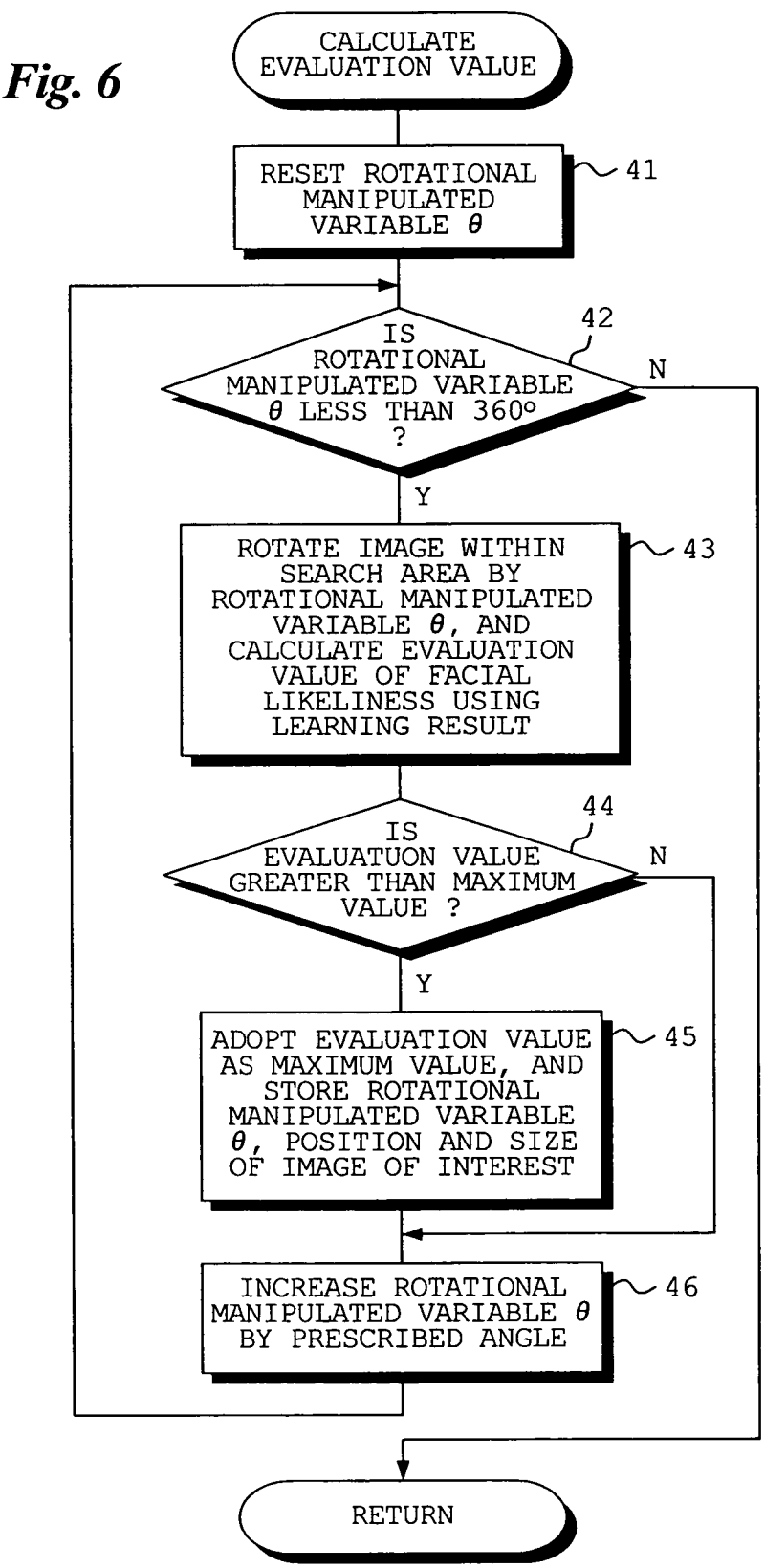
FIG. 6 is a flowchart illustrating processing for calculating an evaluation value.

FIG. 6 is a flowchart illustrating processing for calculating an evaluation value (the processing at step 34 in FIG. 4).

In this processing, the image in search area AS is rotated at increments of 15° about the center of the search area AS and an evaluation value indicating the extent to which the image is face-like is calculated using the result of learning regarding the rotated image within the search area AS.

First, a rotational manipulated variable θ indicating angle of rotation of the image within the search area AS is reset to zero (step 41). When the rotational manipulated variable θ reaches 360°, the image within the search area AS will have made one complete revolution. When the rotational manipulated variable θ becomes equal to or greater 360°, therefore ("NO" at step 42), then processing for calculating the evaluation value at this position of the search area AS ends. If the manipulated variable θ is less than 360° ("YES" at step 42), then the image within the search area AS is rotated by the rotational manipulated variable θ (where counter-clockwise is taken as being the positive direction) and the evaluation value of the image within the search area AS is calculated using the result of learning (step 43).

If the evaluation value obtained is larger than the maximum value ("YES" at step 44), then this evaluation value is adopted anew as the maximum value and the rotational manipulated variable θ, the position of the search area and the size information of the image of interest are stored (step 45). If the evaluation value obtained is not larger than the maximum value ("NO" at step 44), then the processing of step 45 is skipped. The manipulated variable θ is increased by 15° (step 46) and the image within the search area AS is rotated through the angle specified by the increased manipulated variable θ. Processing for calculating the evaluation value is repeated in similar fashion using the result of learning regarding the rotated image within the search area AS.

Thus, the rotational manipulated variable θ is increased in increments of 15°, the evaluation value of facial likeliness is calculated with regard to the image, which has been rotated incrementally by the manipulated variable θ (i.e., through 15°, 30°, 45°, . . . ), within the search area AS, as the maximum value among these obtained evaluation values is stored. As mentioned above, processing for calculating the evaluation value is executed with regard to all areas of many images of interest of different sizes and the manipulated variable θ that affords the largest evaluation value is stored. For instance, in the example of FIG. 7, the evaluation value of facial likeliness obtained based upon the result of learning is maximized in a case where the manipulated variable θ of the image within search area AS1 is zero with regard to an image of interest I1. Inclination α (=360°−θ) of the face within the image of interest I1 is zero at this time.

Figure 7:
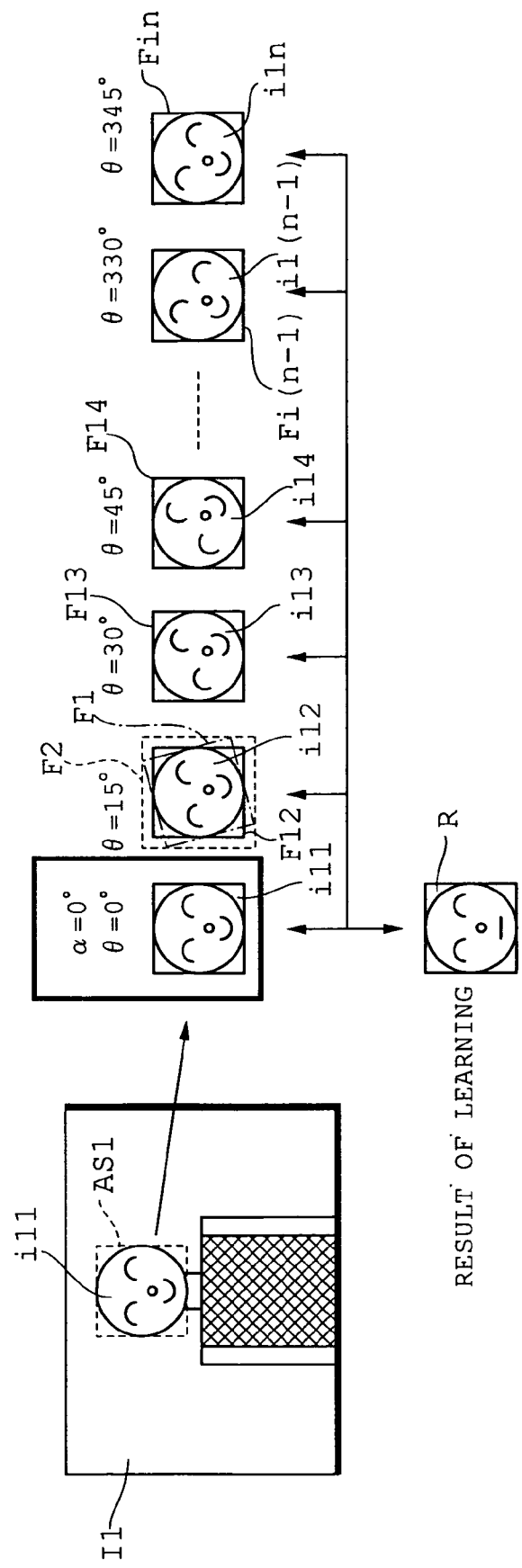
FIG. 7 illustrates an image rotated in a search area and result of learning.

FIG. 7 illustrates the image within the search area AS1 and result R of learning for detecting facial likeliness. The learning result R is displayed as a template image in order to facilitate comprehension.

An image i11 within the search area AS1 is one that has no inclination.

The evaluation value of facial likeliness of the image i11 within the search area AS1 for which the rotational manipulated variable θ is zero is calculated using the result of learning. Next, the rotational manipulated variable θ is increased by 15° and the evaluation value of facial likeliness of an image i12 (where the image after the rotation thereof is indicated at i12, etc.) within a search area AS2 for which the rotational manipulated variable θ is 15° is calculated. Similarly calculated are evaluation values of facial likeliness of images i13, i14 for which the rotational manipulated variables θ are 30° and 45°, respectively, after having been increased by a further 15° and then by a further 15°. This is continued up to evaluation value calculation processing with respect to an image i1n for which the manipulated variable θ is 345°, and the maximum evaluation value is obtained in the manner described above.

A frame F1 obtained by rotating the search area AS1 through the rotational manipulated variable θ of 15° is imagined in such a manner that a rotational manipulated variable θ of between 15 and 345° is indicated typically by a rotational manipulated variable θ of 15°. Consider a frame F2 in which the frame F1 is inscribed and for which the rotational manipulated variable θ is 0°. A frame F12 for which the size of the frame F2 takes on a size the same as that of the frame F1 is determined (the frame F12 has a size and orientation identical with those of the search area AS1). The evaluation value of facial likeliness of the image i12 within the frame F12 is calculated based upon the result of learning. The evaluation values of facial likeliness of images within frames from F13 to Fin obtained in similar fashion are calculated with regard to the other rotational manipulated variables θ of 30 to 345°.

In the example illustrated in FIG. 7, the image i11 has no inclination and therefore the evaluation value of facial likeliness with respect to the image i11 for which the rotational manipulated variable θ is zero is the maximum value. This is stored together with the position, etc., of the search area AS1 whose rotational manipulated variable θ is zero.

The rotational manipulated variable θ is zero. When the image of interest I1 is displayed, therefore, the correction angle β is zero and the image of interest is displayed without undergoing a rotational correction.

Figure 8:
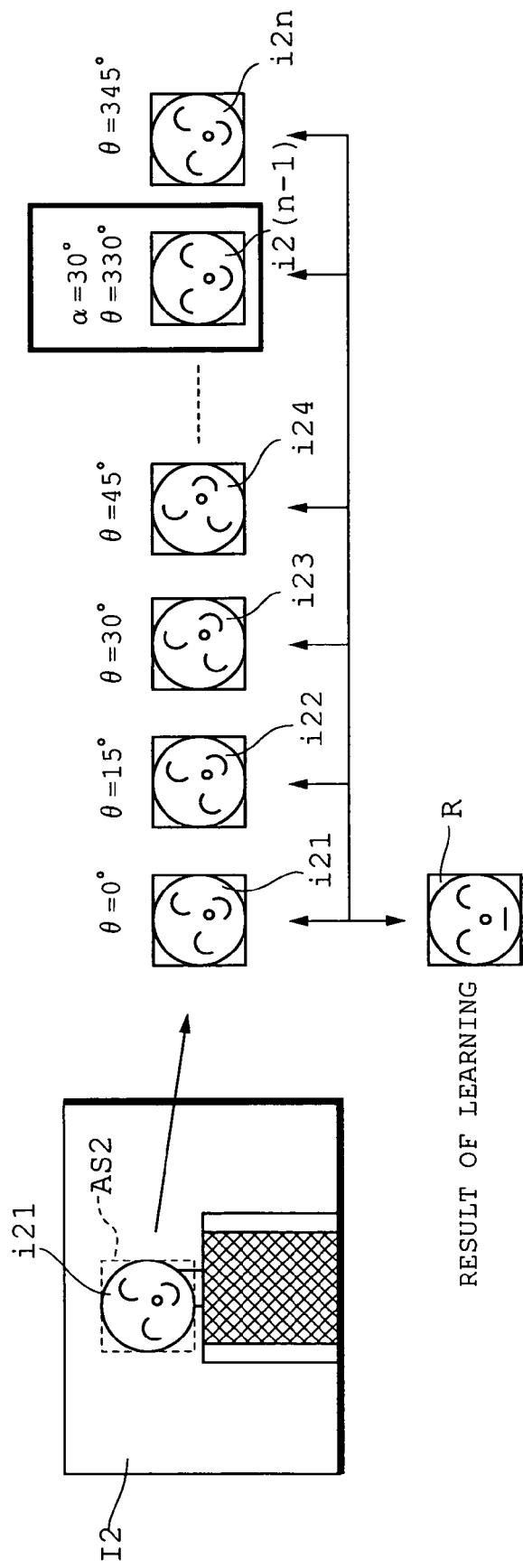
FIG. 8 illustrates an image rotated in a search area and result of learning.

FIG. 8 illustrates another example of the image within a search area and result of learning for detecting facial likeliness.

Here an image i21 within a search area AS2 contained in an image of interest I is inclined leftward (in the counter-clockwise direction) by 30°.

In a manner similar to that described above, use is made of result of learning to calculate facial likeliness with regard to images i21 to i2n obtained in a case where the rotational manipulated variable θ of the image i21 within the search area AS2 has been rotated from 0 to 345° in increments of 15°. The image i21 has a leftward inclination of 30°. In a case where the result of learning is used, therefore, the evaluation value of facial likeliness with respect to an image i2(n-1) that prevails when the rotational manipulated variable θ is 330° takes on the maximum value. The manipulated variable θ of 330° is stored together with the position of the search area AS2.

Since the manipulated variable θ is 330°, the correction angle β becomes zero when the image of interest I2 is displayed, as mentioned above.

Figure 9:
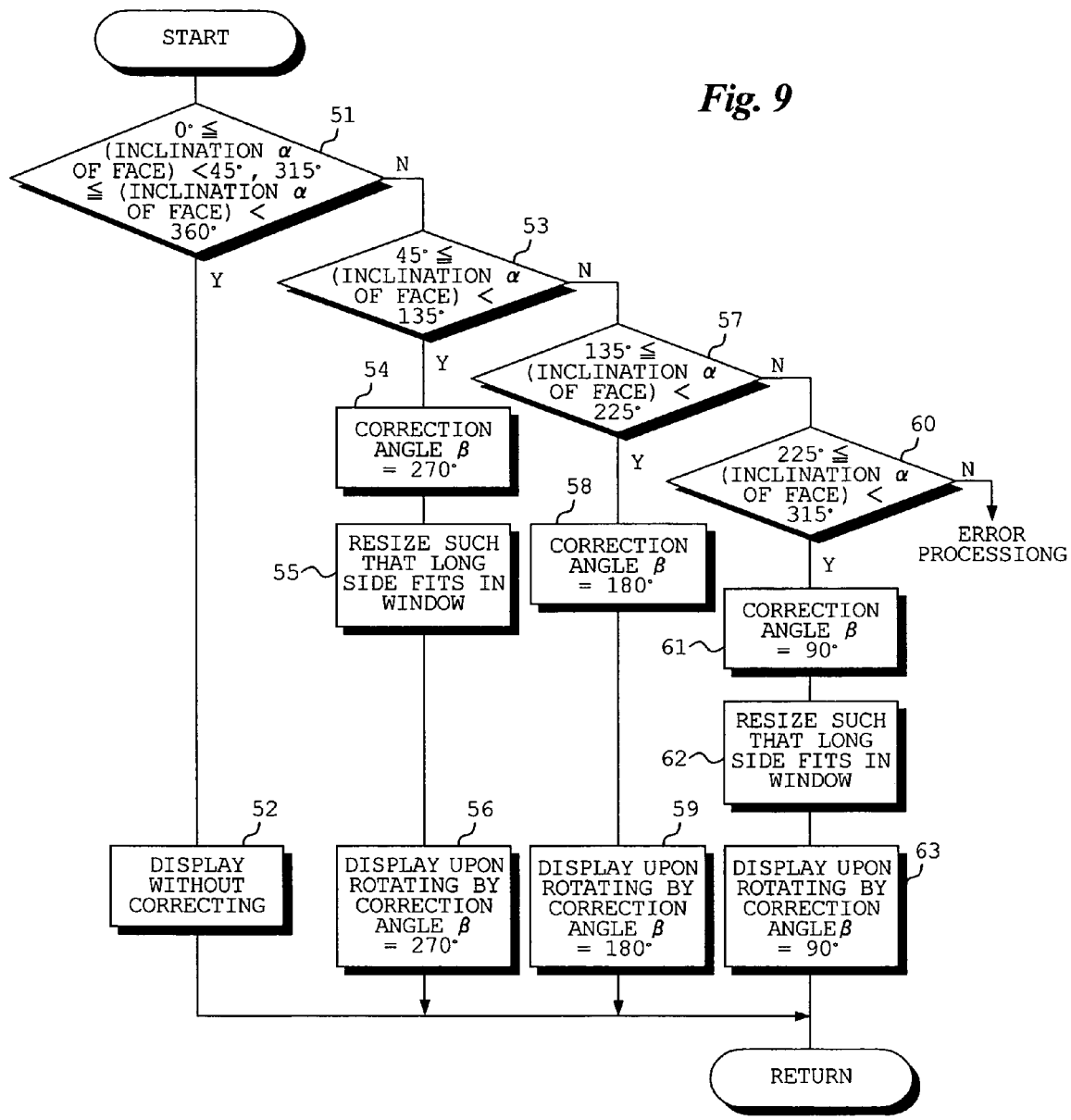
FIG. 9 is a flowchart illustrating processing for calculating a correction angle.

FIG. 9 is a flowchart illustrating processing for displaying an image of interest, and FIG. 10, which shows an image of interest, illustrates the manner in which processing is executed for resizing the image of interest performed in processing for displaying the image of interest.

In processing for displaying the image of interest, use is made of the inclination of the face of the image within the search area AS that affords the maximum evaluation value. The inclination of the face is represented by $\alpha = 360° - \theta$ using the above-described rotational manipulated variable θ.

In a case where the inclination α of the face is equal to or greater than 0° and less than 45° or equal to or greater than 315° and less than 360° ("YES" at step 51), the person will be closer to the upright state if the display angle is not corrected. Accordingly, the image of interest is displayed as is without the display angle being corrected (step 52).

If the inclination α of the face is equal to or greater than 45° and less than 135° ("YES" at step 53), then the correction angle β is set to 270° (step 54). Thus the image of interest is rotated through an angle of 270°. By rotating the image of interest, an image of interest that is in the landscape-type format is displayed in the portrait-type format. Resize processing, therefore, is applied to the image of interest (step 55).

With reference to (A) in FIG. 10, an image I of interest that is in the landscape format is being displayed in a display window (or on a display screen) w. The display window w has a height h1 and a width w1. When such an image I of interest has been rotated 270° in the counter-clockwise direction, the image of interest following the rotation thereof can no longer be displayed within the display window w. For this reason, the size of the image of interest is resized in such a manner that the width w2 of the image of interest prevailing at the time of the landscape-type display will become the height h1 of the window w. The size of the image of interest obtained by such resizing is such that height becomes h2 and the width w2 when the display is presented in the landscape format, as illustrated at (B) in FIG. 10. Even if the image of interest that has been resized is displayed upon being rotated by 270°, the image of interest will fit into the display window w, as illustrated at (C) in FIG. 10.

With reference again to FIG. 9, if the inclination α of the face is equal to or greater than 135° and less than 225° ("YES" at step 57), then the correction angle β is set to 180° (step 58).

The image of interest is displayed upon being rotated by the set correction angle of 180° (step 59).

If the inclination α of the face is equal to or greater than 225° and less than 315° ("YES" at step 60), then the correction angle β is set to 90° (step 61). In this case, the display of the image of interest changes from the landscape to the portrait format and therefore the image of interest is subjected to resize processing in a manner similar to that of the case where the inclination of the face is equal to or greater than 45° and less than 135° (step 62). The image of interest thus resized is displayed upon being rotated through a correction angle β of 90° (step 63).

Thus, the display angle of the image of interest is rotated in accordance with the inclination of the face in such a manner that the image of interest becomes easier to view.

Another embodiment of the invention will be described with reference to FIGS. 11 to 13.

In the embodiment described above, an image within a search area is rotated through a specified angle in prescribed angular increments and processing for calculating an evaluation value of facial likeliness is executed at each angular increment. In the embodiment illustrated next, however, an image within a search area is not rotated. Rather, the result of learning is rotated through a specified angle in prescribed angular increments (this corresponds to processing for calculating a learning result that enables detection of the image of a face that has been rotated by the prescribed angular increments) and processing for calculating an evaluation value of facial likeliness is executed at each angular increment.

Figure 11:
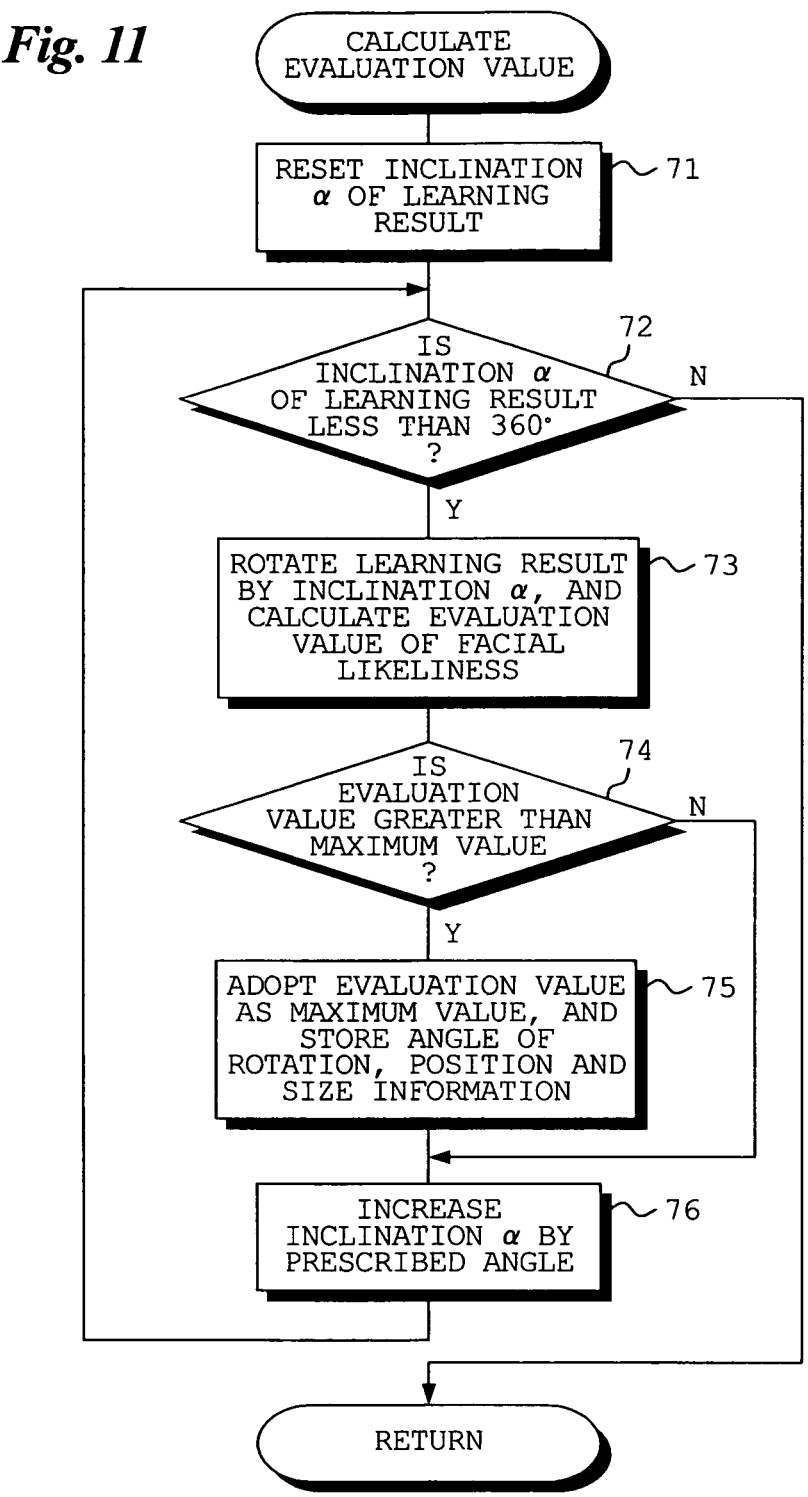
FIG. 11 is a flowchart illustrating processing for calculating an evaluation value according to a second embodiment of the invention.

FIG. 11 is a flowchart illustrating processing (which corresponds to FIG. 6) for calculating an evaluation value.

Inclination α of a learning result (since the inclination of the learning result corresponds to the above-mentioned inclination of a face, use is made of the same character α as that employed for the inclination of the face) is reset to zero (step 71). It is determined whether the inclination α of the learning result is less than 360°. If the inclination α is less than 360° ("YES" at step 72), then the learning result is rotated through the angle of the inclination α and the evaluation value of facial likeliness of the image within the search area AS is calculated using the result of learning that has been rotated (step 73).

It is determined whether the evaluation value calculated is greater than the maximum evaluation value (step 74). If the evaluation value calculated is larger than the maximum value ("YES" at step 74), then the angle of rotation (inclination α) of the learning result that has afforded this maximum value, the position in the image of interest within the search area and the size of the image of interest are stored together with this maximum value (step 75). The inclination α is increased by 15° (step 76) and processing from step 72 to step 75 is repeated.

Figure 12:
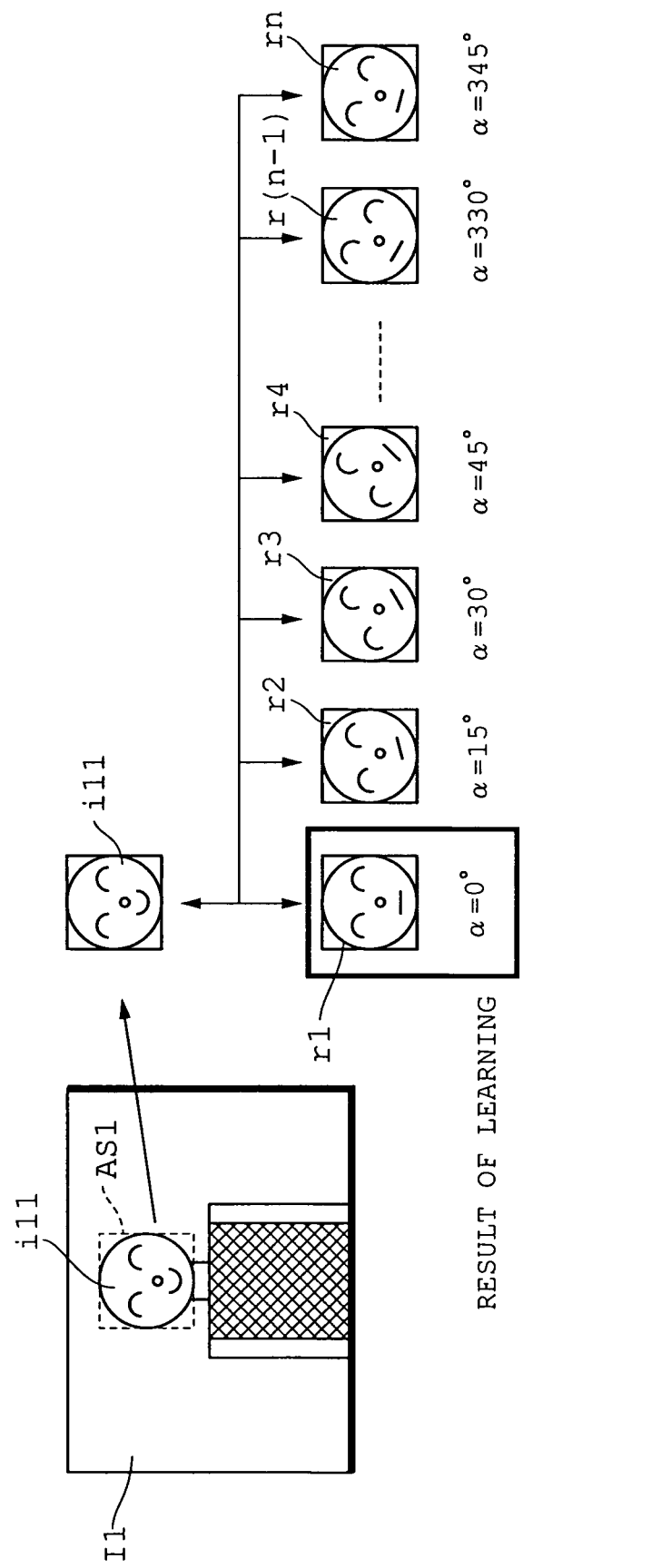
FIG. 12 illustrates an image rotated in a search area and result of learning according to the second embodiment of the invention.

FIG. 12 illustrates the relationship between an image within the search area AS1 and result of learning.

The image i11 of the face within the search area AS1 is one that has no inclination.

The evaluation value of facial likeliness of the image i11 within the search area AS1 is calculated using a learning result r1 that prevails at an inclination α of zero. Next, the inclination α is increased by 15° and the evaluation value of facial likeliness of the image i11 within the search area AS is calculated using a learning result r2 that prevails at an inclination α of 15°. Similarly, evaluation values of facial likeliness of the image i11 within the search area AS are calculated using learning results r3, r4 for which the inclinations α are 30° and 45°, respectively, after having been increased by a further 15° and then by a further 15°. This is continued up to evaluation value calculation processing that uses the learning result prevailing at inclination α=345°.

In the example illustrated in FIG. 12, the face image i11 contained in the search area AS1 has no inclination and therefore the evaluation value obtained when use is made of the learning result r1 for which the inclination α is zero is the maximum value. The inclination of the learning result r1, etc., is stored in the manner mentioned earlier.

The inclination α is zero. When the image of interest I1 is displayed, therefore, the correction angle β is zero and the image of interest I is displayed without undergoing a rotational correction, as mentioned above.

Figure 13:
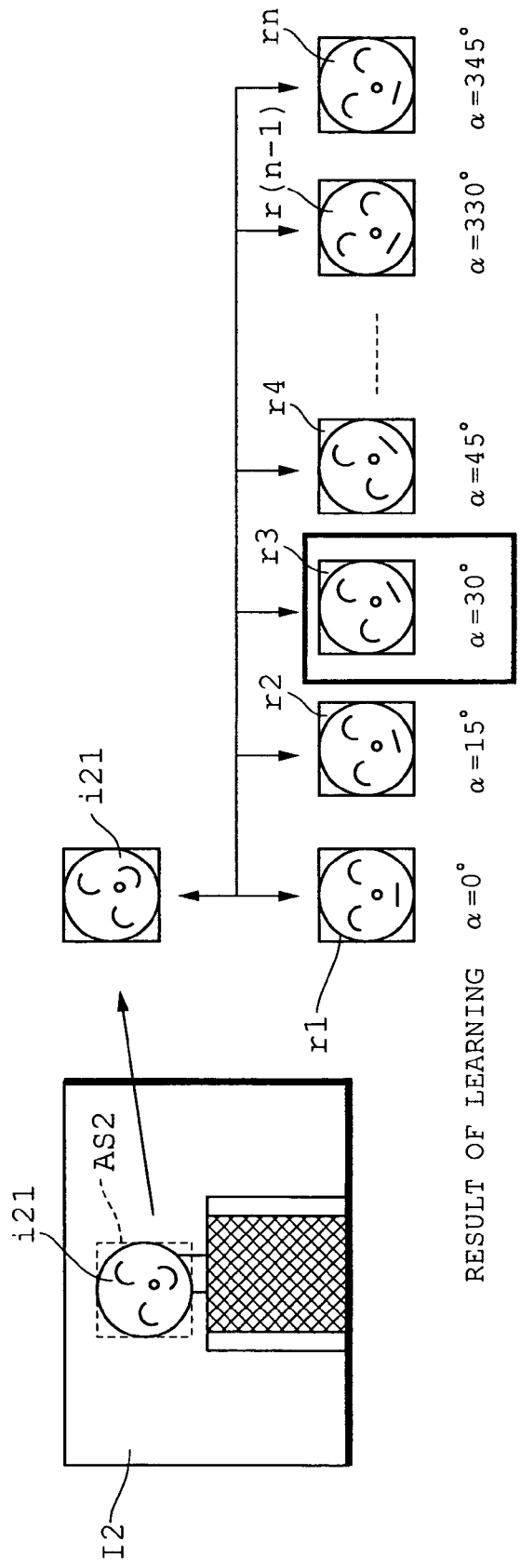
FIG. 13 illustrates an image rotated in a search area and result of learning according to the second embodiment of the invention.

FIG. 13 illustrates the relationship between the image i21 within the search area AS2 and result of learning.

Here the image i21 within the search area AS2 contained in the image of interest I2 is inclined leftward (in the counterclockwise direction) by 30°.

In a manner similar to that described above, the evaluation value of facial likeliness of image i21 within the search area AS2 is calculated using learning result r1 at inclination α=0°, learning result r2 at inclination α=15°, etc. Since the image i21 of the face within the search area AS2 has an inclination of 30°, the evaluation value of facial likeliness that employs learning result r3 at inclination α=30° is the maximum value. The inclination for learning result r3 is stored, as described earlier.

Since the inclination α is 30°, the correction angle β becomes zero when the image of interest I2 is displayed (step 52 in FIG. 9).

Thus, since the angle of display is not corrected when the neck of the person is somewhat inclined, it is possible to prevent a situation in which the image of interest is rendered unattractive by a correction.

Figure 14:
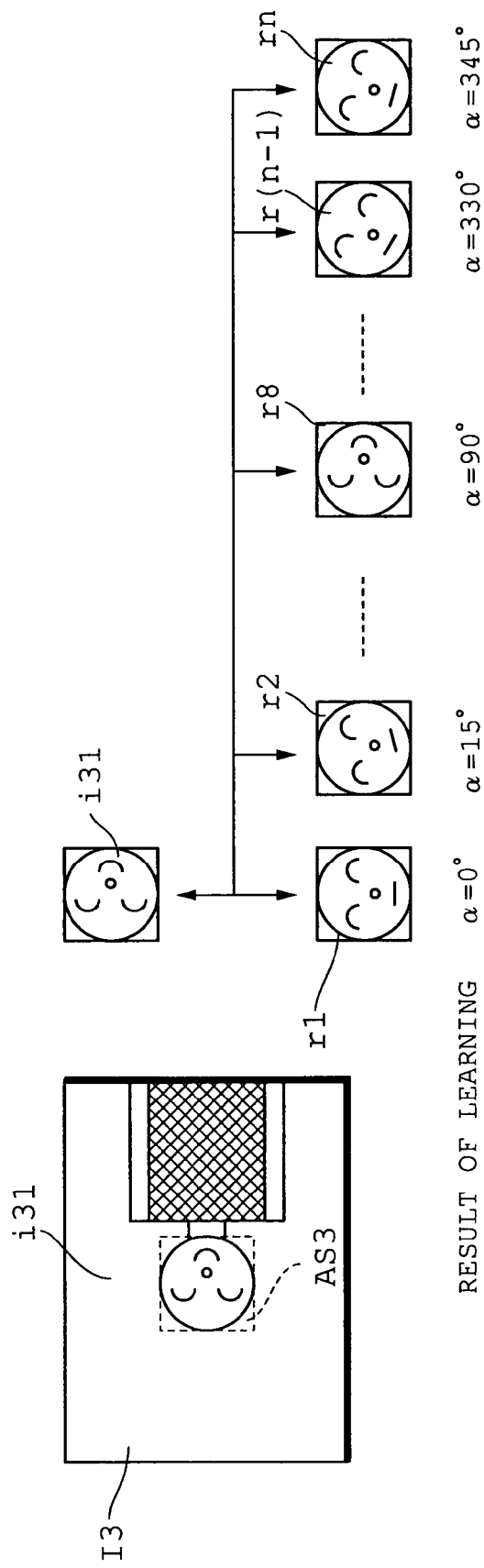
FIG. 14 illustrates an image rotated in a search area and result of learning.

FIG. 14 also illustrates the relationship between an image i31 within a search area AS3 and result of learning.

An image of interest I3 is one obtained by sensing an image when a digital still camera is held vertically.

In a manner similar to that described above, evaluation values of facial likeliness of the image within the search area AS of image of interest I3 are calculated using learning results r1 to rn obtained by increasing the inclination α from 0 to 345° in increments of 15°.

Since the image of interest I3 is one obtained by sensing an image when a digital still camera is held vertically, the evaluation value of facial likeliness that employs learning result r8 at inclination α=90° is the maximum value. Accordingly, the correction angle of image of interest I3 is 270° (step 54 in FIG. 9) and the image of interest I3 is displayed upon being rotated by 270°. Thus, the image of interest I3 is displayed in an orientation suitable for appreciation.

It goes without saying that the image of interest I3 is subjected to resizing processing in a case where the image of interest I3 will not fit within the display window owing to rotation of the image of interest I3 by 90°. Of course, resize processing need not necessarily be executed.

In the embodiment described above, the result obtained by inclining the result of learning by the inclination α is calculated on each occasion. However, the calculation processing may be executed in advance and the result of learning obtained by inclination at the inclination α may be stored beforehand. The learning results thus stored would be stored in, e.g., ROM 22 and used in processing for calculating an evaluation value of facial likeliness in the manner described above.

As many apparently widely different embodiments of the present invention can be made without departing from the spirit and scope thereof, it is to be understood that the invention is not limited to the specific embodiments thereof except as defined in the appended claims.

What is claimed is:

1. An image display control apparatus comprising:
an in-area-image rotating device that is configured to scan a search area with a prescribed size on respective ones of a plurality of images of interest with different sizes, each of the plurality of images of interest with different sizes being obtained in such a manner that the size of an image of interest becomes gradually smaller and the image of interest diminishes to a prescribed minimum image size, and configured to rotate an in-area-image, which is located within the search area scanned on images of interest, contained in each image of interest, through a specified angle in prescribed angular increments;
an evaluation-value calculating device configured to calculate an evaluation value, which represents facial likeliness of the in-area-image within the search area at each angle for each image of interest through which the in-area-image has been rotated in the prescribed angular increments by said in-area-image rotating device, using detection data for detecting a face image;
a rotation correction angle deciding device configured to decide a rotation correction angle which displays the detected face image in a rectangle display window in upright, based upon an angle that affords a maximum value of the evaluation value representing facial likeliness at each angle for each image of interest by said evaluation-value calculating device; and
a display control device configured to control a display unit, in such a manner that each image of interest is rotated and displayed in the rectangle display window, using the rotation correction angle decided by said rotation correction angle deciding device, thereby each image of interest in which the image of a person has been rendered upright is displayed on the rectangle display window.

2. The apparatus according to claim 1, further comprising a resizing device configured to resize each image of interest in such a manner that each image of interest after the rotation thereof will fit within the display window in a case where each image of interest rotated and displayed in the display window.

3. The apparatus according to claim 1, wherein the display window comprises a rectangle, and said rotation correction angle deciding device is configured to decide the rotation correction angle of each image of interest in such a manner that one side of the rectangle will be rendered horizontal.

4. The apparatus according to claim 1, wherein the display control device is configured to control the display unit so that each image of interest is displayed upright.

5. The apparatus according to claim 1, further comprising an evaluation-value calculation control device configured to control the evaluation-value calculating device in such a manner that evaluation-value calculation processing is executed every prescribed angular increment.

6. The apparatus according to claim 1, further comprising a detection data storage device in which detection data configured to detect a face image is stored, the detection data being data suited to each of the prescribed angular increments, the data being stored in correspondence with each prescribed angular increment.

7. A method of controlling an image display the method comprising:
scanning a search area with a prescribed size on respective ones of a plurality of images of interest with different sizes, each of the plurality of images of interest with different sizes being obtained in such a manner that the size of an image of interest becomes gradually smaller and the image of interest diminishes to a prescribed minimum image size;

rotating an in-area-image, which is located within the search area scanned on images of interest, contained in each image of interest, through a specified angle in prescribed angular increments;

calculating an evaluation value, which represents facial likeliness of the in-area-image within the search area at each angle for each image of interest through which the in-area-image has been rotated in the prescribed angular increments, using detection, data for detecting a face image;

deciding a rotation correction angle for displaying the detected face image in a rectangle display window in upright, based upon an angle that affords a maximum value of the evaluation value representing facial likeliness at each angle for each image of interest; and controlling a display unit, in such a manner that each image of interest is rotated and displayed in the rectangle display window, using the rotation correction angle decided, thereby each image of interest in which the image of a person has been rendered upright is displayed on the rectangle display window.

8. A tangible computer-readable storage device embodying a program of an image display control apparatus, said program:

scanning a search area with a prescribed size on respective ones of a plurality of images of interest with different sizes, each of the plurality of images of interest with different sizes being obtained in such a manner that the size of an image of interest becomes gradually smaller and the image of interest diminishes to a prescribed minimum image size;

rotating an in-area-image, which is located within the search area scanned on images of interest, contained in each image of interest, through a specified angle in prescribed angular increments;

calculating an evaluation value, which represents facial likeliness of the in-area-image within the search area at each angle for each image of interest through which the in-area-image has been rotated in the prescribed angular increments, using detection data for detecting a face image;

deciding a rotation correction angle for displaying the detected face image in a rectangle display window in upright, based upon an angle that affords a maximum value of the evaluation value representing facial likeliness at each angle for each image of interest; and controlling a display unit, in such a Manner that each image of interest is rotated and displayed in the rectangle display window, using the rotation correction angle decided, thereby each image of interest in which the image of a person has been rendered upright is displayed on the rectangle display window.

9. A camera, comprising:

an image display control apparatus, comprising:

an in-area-image rotating device that is configured to scan a search area with a prescribed size on respective ones of a plurality of images of interest with different sizes, each of the plurality of images of interest with different sizes being obtained in such a manner that the size of an image of interest becomes gradually smaller and the image of interest diminishes to a prescribed minimum image size, and that is configured to rotate an in-area-image, which is located within the search area scanned on images of interest, contained in each image of interest, through a specified angle in prescribed angular increments;

an evaluation-value calculating device that is configured to calculate an evaluation value, which represents facial likeliness of the in-area-image within the search area at each angle for each image of interest through which the in-area-image has been rotated in the prescribed angular increments by said in-area-image rotating device, using detection data for detecting a face image;

a rotation correction angle deciding device configured to decide a rotation correction angle which displays the detected face image in a rectangle display window in upright, based upon an angle that affords a maximum value of the evaluation value representing facial likeliness at each angle for each image of interest by said evaluation-value calculating device, and a display control device that is configured to control a display unit, in such a manner that each image of interest is rotated and displayed in the rectangle display window, using the rotation correction angle decided by said rotation correction angle deciding device, thereby each image of interest in which the image of a person has been rendered upright is displayed on the rectangle display window.

10. The camera according claim 9, wherein the image display control apparatus further comprises a resizing device that is configured to resize each image of interest in such a manner that each image of interest after the rotation thereof will fit within the display window in a case where each image of interest is rotated and displayed in the display window.

11. The camera according to claim 9, wherein the display window comprises a rectangle, and said rotation correction angle deciding device is configured to decide the rotation correction angle of each image of interest in such a manner that one side of the rectangle will be rendered horizontal.

* * * * *